United States Patent
von Schönebeck et al.

(10) Patent No.: US 10,184,337 B2
(45) Date of Patent: Jan. 22, 2019

(54) MACHINE AND METHOD FOR SURFACE MINING OR ROAD MILLING

(71) Applicant: Wirtgen GmbH, Windhagen (DE)

(72) Inventors: Winfried von Schönebeck, Kalenborn (DE); Klaus Vollmann, Waldbröl (DE); Stefan Wagner, Bad Honnef (DE); Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/124,281

(22) PCT Filed: Mar. 16, 2015

(86) PCT No.: PCT/EP2015/055470
§ 371 (c)(1),
(2) Date: Sep. 7, 2016

(87) PCT Pub. No.: WO2015/140121
PCT Pub. Date: Sep. 24, 2015

(65) Prior Publication Data
US 2017/0096894 A1    Apr. 6, 2017

(30) Foreign Application Priority Data

Mar. 17, 2014    (AU) ............................... 2014900903

(51) Int. Cl.
*E21C 39/00*    (2006.01)
*G01V 3/02*    (2006.01)
(Continued)

(52) U.S. Cl.
CPC ............ *E21C 39/00* (2013.01); *E01C 23/088* (2013.01); *E01C 23/127* (2013.01); *E21C 25/10* (2013.01);
(Continued)

(58) Field of Classification Search
CPC .......... E21C 39/00; E21C 35/24; E21C 25/10; E01C 23/088; E01C 19/004; E01C 23/127; G01B 7/06; G01V 3/02; G01V 8/10

See application file for complete search history.

(56) References Cited

U.S. PATENT DOCUMENTS 4,715,657 A    12/1987    Sato et al.
4,968,098 A    11/1990    Hirsch et al.
(Continued)

FOREIGN PATENT DOCUMENTS

| DE | 3504610 A1 | 8/1986 |
| EP | 0697604 A1 | 2/1996 |
| FR | 2610114 A1 | 7/1988 |

OTHER PUBLICATIONS

International Preliminary Report on Patentability in corresponding international application No. PCT/EP2015/055470 dated Sep. 20, 2016, 7 pp. (not prior art).

(Continued)

*Primary Examiner* — Carib A Oquendo
(74) *Attorney, Agent, or Firm* — Lucian Wayne Beavers; Gary L. Montle; Patterson Intellectual Property Law, PC

(57) ABSTRACT

The present disclosure provides a machine (100) for surface mining or road milling. The machine (100) is arranged to remove material from a ground region (102) while moving along the ground region (102) and comprises a ground engager for removing a portion of the material from the ground region (102). The machine (100) further comprises a detecting system (110) that has at least one detector element coupled to a component of the machine (100) to move with the machine (100) and arranged to detect at least one quantity associated with an electrical property of the ground region (102). The detecting system (110) is arranged to provide composition information concerning a composition
(Continued)

of at least one material layer in the ground region (102) and thickness information concerning a thickness of at least one material layer (102*a,b,c,d*). The detected at least one quantity associated with the electrical property is used to provide at least one of the composition information and the thickness information.

24 Claims, 4 Drawing Sheets

(51) Int. Cl.
    *E01C 23/088*    (2006.01)
    *E01C 23/12*    (2006.01)
    *E21C 25/10*    (2006.01)
    *G01B 7/06*    (2006.01)
    *G01V 8/10*    (2006.01)

(52) U.S. Cl.
    CPC ............... *G01B 7/06* (2013.01); *G01V 3/02* (2013.01); *G01V 8/10* (2013.01)

(56) References Cited

U.S. PATENT DOCUMENTS

| | | | |
|---|---|---|---|
| 4,981,327 A | 1/1991 | Bessinger et al. | |
| 5,092,657 A * | 3/1992 | Bryan, Jr. | E21C 35/10 299/1.1 |
| 5,607,205 A * | 3/1997 | Burdick | E01C 19/00 299/1.5 |
| 6,666,521 B1 * | 12/2003 | Pease | E21C 27/24 299/1.05 |
| 2008/0185903 A1 * | 8/2008 | Bausov | E21C 27/24 299/1.2 |
| 2010/0039127 A1 * | 2/2010 | Orazem | C23F 13/04 324/718 |
| 2010/0063691 A1 | 3/2010 | Hall et al. | |
| 2012/0049607 A1 | 3/2012 | Frederick | |
| 2016/0025851 A1 * | 1/2016 | Hall | G01S 7/28 342/22 |
| 2016/0097277 A1 * | 4/2016 | Friend | G01D 5/35316 299/1.05 |

OTHER PUBLICATIONS

International Search Report in corresponding international application No. PCT/EP2015/055470 dated Nov. 16, 2015, 5 pp. (not prior art).

Written opinion of International Search Report in corresponding international application No. PCT/EP2015/055470 fated Nov. 16, 2015, 6 pp. (not prior art).

* cited by examiner

MACHINE AND METHOD FOR SURFACE MINING OR ROAD MILLING

FIELD OF THE INVENTION

The present invention relates to a machine and method for surface mining or road milling.

BACKGROUND OF THE INVENTION

While surface mining machines are vastly larger than road milling machines, both types of machine have in common that they typically have milling drums with chisels in chisel holders. The chisels engage with a ground region and remove material form a surface of the ground region.

In the field of surface mining, quality of the mined material depends on the ratio between desired material such as material having a high ratio of mineral deposits, and undesired material such as rock.

To improve the ratio of desired material to undesired material it is desirable to determine information on a position of an interface between a material layer having the desired material and an adjacent material layer having more undesired material or other materials.

A camera may be used to provide still images or moving images of the surface area that is to be mined or that is already mined so that an operator of the surface miner can adjust the milling depth or interrupt the mining process if there is visible change in a surface composition of the ground region.

Further methods have been proposed, but all of them have drawbacks and there is a need for improvement.

SUMMARY OF THE INVENTION

In accordance with a first aspect of the present invention, there is provided a machine for surface mining or road milling, the machine being arranged to remove material from a ground region while moving along the ground region, and comprising:
  a ground engager for removing a portion of the material from the ground region; and
  a detecting system comprising at least one detector element coupled to a component of the machine to move with the machine and arranged to detect at least one quantity associated with an electrical property of the ground region, the detecting system being arranged to provide composition information concerning a composition of at least one material layer in the ground region and thickness information concerning a thickness of the at least one material layer,
  wherein at least the detected at least one quantity associated with the electrical property is used to provide at least one of the composition information and the thickness information.

Throughout this specification the term "thickness information" is used for any type of information that relates to the thickness of one or more material layers, but may not necessarily determine this thickness. For example, the thickness information may be information indicative of a location, a presence or absence of an interface or an interfacial region between two adjacent material layers.

Throughout this specification the term "composition information" is used for any type of information that relates to the composition of one or more material layers, but may not necessarily identify each material within the one or more material layers. For example, the composition information may be information indicative of whether a material layer is classified as desired or undesired material.

A person skilled in the art will appreciate that any suitable number of quantities may be detected. For example, detected quantities may be part of a series of measurements from which at least one of the above mentioned information is determined. For example, respective quantities associated with the electrical property may be used to provide the composition information and the thickness information.

In one embodiment the electrical property is an electrical resistivity and may be an electrical impedance. Alternatively, the electrical property may be a conductivity, an inductance, a capacity, or a combination of the aforementioned.

The at least one detector element may be positioned in front of or behind the ground engager relative to a moving direction of the machine.

In one embodiment, the at least one detector element is positioned behind the ground engager and is arranged to detect first and second quantities associated with the electrical property, wherein the first quantity is used to provide the composition information and the second quantity is used to provide the thickness information. A person skilled in the art will appreciate that the at least one detector element may be arranged to detect any suitable number of quantities.

Further, the machine may comprise a plurality of detector elements, each of the plurality of detector elements may be positioned in front of or behind the ground engager relative to a moving direction of the machine. In one specific embodiment at least one detector element is positioned to detect in front of the ground engager at least one quantity from which in use the detecting system provides the thickness information. Further, at least one other detector element is in this specific embodiment positioned to detect behind the ground engager at least one quantity from which in use the detecting system provides the composition information.

In a further example, at least two detector elements may be positioned spaced apart in front of the ground engager or behind the ground engager.

The detecting system may be arranged such that respective quantities are detected at at least two different height levels relative to the ground region and the detecting system may use the detected quantities to provide at least the thickness information. Specifically, if the quantities detected at the at least two different height levels indicate substantially the same material composition, it may be concluded that either no interface or interfacial region is positioned between the at least two different height levels or that an interface or interfacial region of adjacent substantially identical material layers is located between the at least two different height levels. Alternatively, if the detected quantities indicate different compositions, it may be concluded that an interface or interfacial region is positioned at a height level between the at least two different height levels.

The detection system may be arranged to perform subsurface resistivity measurements for determining a property of one or more materials of a subsurface of the ground region, such as Electrical Resistivity Tomography (ERT), Electrical Resistivity Imaging (ERI), Induced Polarisation Imaging (IPI) or other suitable measurements.

In one embodiment the detection system is arranged such that a depth of investigation that corresponds to the resistivity measurements can be varied.

Additionally or alternatively, the detection system may be arranged to perform surface resistivity measurements for determining a property of a material at the surface of the ground region. In one example, the surface may be a surface of a groove within the ground region.

In a specific example, at least one detector element is positioned in front of the ground engager and arranged to perform subsurface resistivity measurements to provide the thickness information. In this specific example, at least one other detector element is positioned behind the ground engager and arranged to perform a surface resistivity measurement to provide the composition information. Additionally, the at least one other detector element may be arranged to also perform subsurface resistivity measurements to provide the thickness information. Additionally, the at least one other detector element may be arranged to perform surface resistivity measurements to provide the thickness information. For example, in order to provide the thickness information based on the surface resistivity measurement, the surface resistivity measurements may be performed for surfaces at at least two different height levels. In this way, it may be determined whether an interface between two material layers is present between the at least two height levels which by previous definition relates to the thickness information.

The detecting system may also comprise at least one further detector element for detecting at least one further quantity associated with a further property other than the electrical property. The at least one further quantity may be used to provide at least one of the composition information and the thickness information.

In one specific embodiment, the at least one quantity associated with the electrical property is used to provide at least the thickness information and the at least one further quantity is used to provide at least the composition information.

The at least one further detector element may be arranged to perform near-infrared spectroscopy (NIRS). The detecting system may comprise a near-infrared light source the at least one further detector element may comprise a spectrometer and a suitable detector.

Alternatively, the at least one further detector element may be arranged to perform a laser-induced spectroscopy and may comprise a suitable laser source and detector. The laser induced spectroscopy may be Raman spectroscopy or laser-induced fluorescence.

Alternatively, the at least one further detector element may be arranged to perform any suitable methods, such as X-ray fluorescence, gamma ray detection, geo-radar or the like.

The detecting system may be arranged to use the detected at least one further quantity for calibrating the at least one quantity associated with the electrical property.

In a specific example, the at least one detector element is positioned in front of or behind the ground engager and may be arranged to perform subsurface resistivity measurements to provide the thickness information and the at least one further detector element may be positioned behind the ground engager and arranged to perform a laser-based measurement such that the composition information can be provided. Additionally, the at least one further detector element may be arranged to perform the laser-based measurement such that the thickness information can be provided. For example, the laser-based measurement may be performed at at least two different height levels.

In a further specific example, the detecting system comprises a plurality of detector elements and at least one further detector element, wherein one of the plurality of detector elements is positioned in front of the ground engager and arranged to perform subsurface resistivity measurements to provide the thickness information, another one of the plurality of detector elements is positioned behind the ground engager and arranged to perform a surface resistivity measurement to provide the composition information and the at least one further detector element is positioned behind the ground engager and arranged to perform a laser-based measurement to calibrate the subsurface and/or the surface resistivity measurement Additionally, the other one of the plurality of detector elements may be arranged to also perform subsurface resistivity measurements.

In specific embodiments, the at least one detector element comprises a group of electrodes.

At least one electrode of a group of electrodes may in use be positioned at a height level that is lower than that of at least one other electrode of the group of electrodes. In this example, the group of electrodes is arranged to perform at least a surface resistivity measurement. As described above, quantities, such as voltages, detected for different height levels may be used to provide the thickness information of the at least one material layer. For example, the at least one electrode may in use be positioned in a groove of the ground region. The group of electrodes may be arranged such that the spacing between adjacent electrodes, such as current electrodes, can be altered (either manually or electrically for example controlled by an operator) and consequently a depth of investigation associated with the resistivity measurements can be altered.

In one specific example at least one group of electrodes is positioned at a height level that is lower than that of at least one other electrode of the group of electrodes.

The detecting system may comprise a processor for determining the composition information and the thickness information.

The detecting system may further comprise a display for displaying to an operator any suitable information, such as the composition information and the thickness information.

The machine may comprise a controller that is arranged to control the machine, such as the ground engager of the machine, based on the composition information and the thickness information. For example, the controller may be arranged to control a ground engagement by controlling a height of the ground engager relative to the ground region or by interrupting operation of the machine as a function of the composition information and the thickness information.

The machine may comprise a holder for holding the at least one detector element and/or the at least one further detector element.

The ground engager may comprise a milling drum that may comprise a plurality of chisels. The chisels may be held in chisel holders and may be rotatable and exchangeable. The milling drum may comprise chisel holder replacement systems.

In accordance with a second aspect of the present invention, there is provided a method of removing material from a ground region, the method comprising the steps of:
moving a machine for surface mining or road milling along the ground region;
removing a portion of the material from the ground region;
detecting at least one quantity associated with an electrical property of the ground region using at least one detector element that is coupled to a component of the machine to move with the machine; and
providing composition information concerning a composition of at least one material layer in the ground region and thickness information concerning a thickness of the at least one material layer;

wherein at least the detected at least one quantity associated with the electrical property is used to provide at least one of the composition information and the thickness information.

In one embodiment, respective quantities associated with the electrical property are used to provide the composition information and the thickness information.

The step of detecting may comprise detecting quantities associated with the electrical property of the ground region at more than one location relative to the machine. For example, respective quantities may be detected at positions that are spaced apart from each other, such as behind or in front of the ground engager relative to a moving direction of the machine.

The step of detecting may comprise detecting respective quantities at at least two different height levels relative to the ground region and the detected quantities may be used to provide the thickness information. Further, the method may comprise forming a groove into the ground region and detecting at least one of the quantities at a height level within the groove.

The method may comprise performing subsurface resistivity measurements for determining properties of a material of a subsurface of the ground region, such as Electrical Resistivity Tomography (ERT), Electrical Resistivity Imaging (ERI), Induced Polarisation Imaging (IPI) or other suitable measurements.

Additionally or alternatively, the method may comprise performing surface resistivity measurements for determining properties of a material at the surface of the ground region. In one example, the surface may be a surface of a groove of the ground region.

In a specific example, the method is conducted such that subsurface resistivity measurements are conducted at a position in front of the ground engager to provide the thickness information. In this specific example, the method is conducted such that a surface resistivity measurement is performed at a position behind the ground engager to provide the composition information. Additionally, the method may be conducted such that further subsurface resistivity measurements are conducted at the position behind the ground engager to provide the thickness information. Additionally, the method may be conducted such that the surface resistivity measurement at the position behind the ground engager is conducted to also provide the thickness information. For example, the surface resistivity measurement may be performed for at least two different height levels.

In some embodiments, the method comprises a step of detecting at least one further quantity associated with a further property of the ground region, the further property being a property other than the electrical property. Further, the detected at least one further quantity may be used to provide at least one of the composition information and the thickness information.

In one specific embodiment, the detected at least one further quantity is used to provide at least the composition information and the detected quantity associated with the electrical property is used to provide at least the thickness information.

The method may further comprise a step of calibrating the detected at least one quantity associated with the electrical property using the detected at least one further quantity associated with the further property.

In one specific embodiment, the method comprises directing electromagnetic radiation, such as laser radiation, to the ground region and detecting the at least one further quantity may comprise detecting electromagnetic radiation received from the ground region in response to the emitted laser radiation. For example, the method may comprise a step of performing laser-induced spectroscopy.

The method may also comprise displaying to an operator any suitable information, such as the composition information and the thickness information.

Further, the method may comprise controlling the machine such as the ground engager of the machine based on the composition information and the thickness information. For example, the method may comprise controlling a ground engagement by controlling a height of the ground engager relative to the ground region or by interrupting operation of the machine.

In accordance with a third aspect of the present invention, there is provided a machine for surface mining or road milling, the machine being arranged to remove material from a ground region while moving along the ground region, and comprising:

a ground engager for removing a portion of the material from the ground region; and
a detecting system comprising:
a first detector element coupled to a component of the machine to move with the machine, and arranged to detect a first quantity associated with a first property of the ground region; and
a second detector element coupled to a component of the machine to move with the machine, and arranged to detect a second quantity associated with a second property other than the first property;
wherein the detecting system is arranged to provide composition information concerning a composition of at least one material layer in the ground region and thickness information concerning a thickness of the at least one material layer; and
wherein at least the detected first quantity is used to provide at least one of: the composition information and the thickness information.

In one embodiment the detected second quantity is used for calibrating the detected first quantity.

In an alternative embodiment the detected first quantity is used to provide at least the thickness information and the detected second quantity is used to provide at least the composition information. Alternatively, the detected first quantity may be used to provide at least the composition information and the detected second quantity may be used to provide at least the thickness information.

In specific embodiments, the first detector element is positioned in front of the ground engager relative to a moving direction of the machine and the second detector element is positioned behind the ground engager relative to the moving direction of the machine.

The invention will be more fully understood from the following description of specific embodiments of the invention, by way of example only. The description is provided with reference to the accompanying drawings.

DETAILED DESCRIPTION OF EMBODIMENTS OF THE INVENTION

Figure 1:
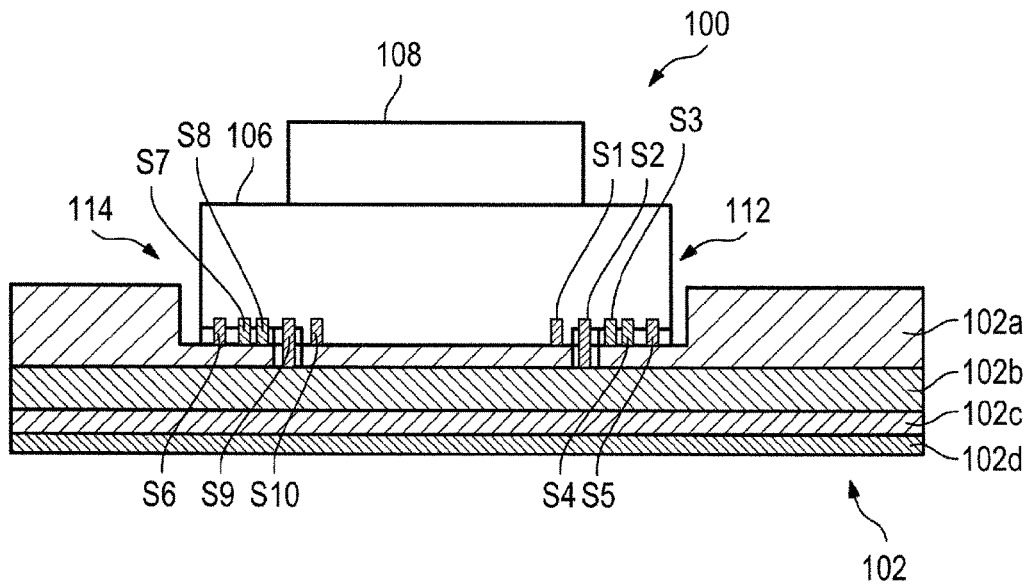
FIG. 1 is a schematic representation of a rear view of a surface miner in accordance with an embodiment of the present invention.

Embodiments of the present invention relate to a machine for surface mining or road milling for removing material from a ground region while moving along the ground region. The machine comprises a ground engager for removing a portion of the material from the ground region, such as a milling or cutting drum. Such a milling or cutting drum may comprise a plurality of chisels that are replaceable and rotatable in respective holders. Further, such a milling or cutting drum may comprise chisel holders that are replaceable without the need of welding.

The machine further comprises a detecting system that is arranged to provide composition information concerning a composition of at least one material layer in the ground region and thickness information concerning a thickness of the at least one material layer. The composition information may be used to identify whether the at least one material layer comprises substantially desired or undesired material. And the thickness information may indicate whether an interface or an interfacial region exists between two adjacent material layers.

The detecting system comprises one or more detector elements that detect at least one quantity associated with an electrical property of the ground region, such as a resistivity of material within the ground region. The detected quantity is used to provide at least one of the composition information and the thickness information. A person skilled in the art will appreciate that any suitable number of quantities may be detected. For example, detected quantities may be part of a series of measurements from which at least one of the above mentioned information is determined.

The detector element is mounted to a component of the machine such that the detector element can move with the machine along the ground region. Such detector element may be mounted to the machine with a holder.

The detecting system may further comprise a processor for determining the composition information and the thickness information. The processor may also be arranged to provide the thickness information in the form of information that is indicative of a position, presence or absence of an interface or an interfacial region between two adjacent material layers or a distance between the interface or interfacial region and the ground engager.

Furthermore, the detecting system may be arranged to provide the composition information and the thickness information for more than one material layer. For example, a first material layer may be located at a surface of the ground region, and a second material layer may be located at a subsurface of the ground region. In this way, the composition and the thickness of at least two adjacent material layers may be determined.

A person skilled in the art will appreciate that two adjacent material layers may differ in relation to a composition of the material contained within. For example, an interface or interfacial region may be indicative of a boundary between two material layers that have different ratios of mineral material.

Figure 2:
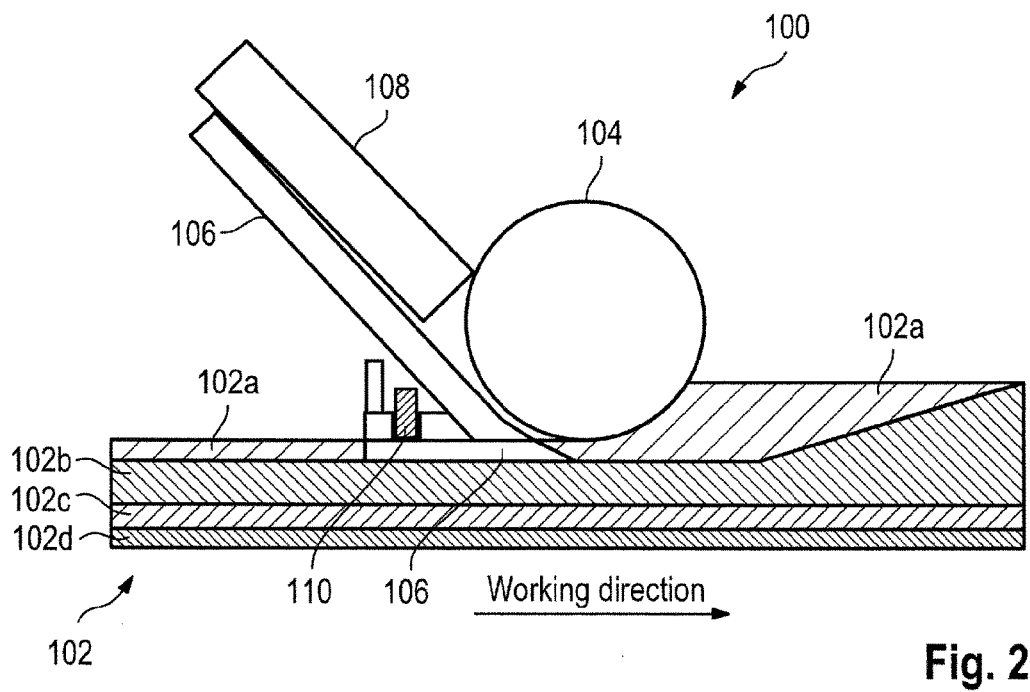
FIG. 2 is a schematic representation of a side view of the surface miner of FIG. 1.

Referring now to FIGS. 1 and 2, there is shown a surface miner 100 in accordance with an embodiment of the present invention. FIG. 1 illustrates a rear view of the surface miner 100 and FIG. 2 illustrates a side view of the surface miner 100.

An exemplary surface miner is a relatively large scale machine (typically weighing more than 100 tons) that is dedicated for mining in the sense that a natural deposit is removed from a mine site. Surface miners have relatively large milling tools and are arranged to break rock from a ground region of a mine. Exemplary surface miners typically have a milling drum with a plurality of chisels that may or may not be positioned in suitable chisel holders and/or chisel holder replacement systems. Exemplary surface miners may have one or more of the following features: milling drum being arranged between front and rear tracks, milling drum driven mechanically and/or hydraulically, milling drum being arranged transversely relative to the moving direction of the surface miner, self-propelled surface miner, machine frame of the surface miner being carried by height adjustable tracks. Other suitable features are envisaged.

A person skilled in the art will appreciate that the features in accordance with embodiments of the present invention described exemplarily in relation to a surface miner also have application for road milling machines.

For example, in the field of road milling machines, it may be desired to determine whether voids such as air voids are present below the surface of a road.

The surface miner 100 is arranged to move along a ground region 102, for example by the use of suitable wheels or tracks (not shown), and to remove a portion of material of the ground region 102 while moving along the ground region 102.

As shown in FIGS. 1 and 2, the exemplary ground region 102 has a material layer 102a located at a surface of the ground region 102 and three material layers 102b, 102c and 102d that are located at a subsurface of the ground region 102. In this example, the composition of the material layers 102a and 102c is substantially identical and represents desired material. Such desired material may contain any suitable materials, such as mineral material as for example iron ore or coal. Further, the composition of the material layers 102b and 102d is substantially identical and represents undesired material, such as rock. A person skilled in the art will appreciate that desired and undesired material layers may differ by a ratio of mineral deposits within the material layer.

The surface miner 100 has a milling drum 104 that comprises a plurality of chisels (not shown) for mining material from a surface of the ground region 102. The milling drum 104 is moveable relative to the ground region 102 such that a milling depth into the ground region 102 can be adjusted, for example by adjusting the height of the milling drum 104 relative to the surface of the ground region 102.

The surface miner 100 also comprises a scraper 106 for scraping loose material after the portion of material is removed from the ground region 102 by the milling drum 104. The scraper 106 is also arranged to guide the mined material to a conveyor system 108.

The surface miner 100 further comprises a detecting system 110 that is mounted to a component of the surface miner 100 and positioned behind the scraper 106 relative to a moving direction of the surface miner 100 which is illustrated by an arrow shown in FIG. 2. However, a person skilled in the art will appreciate that the detecting system 110 may be mounted to any suitable component of the surface miner 100 such that the detecting system 110 moves along with the surface miner 100.

In this embodiment, the detecting system 110 comprises a first group of electrodes 112 positioned at a right side of the scraper 106 relative to the moving direction of the machine 100, and a second group of electrodes 114 positioned at a left side of the scraper 106 as shown in the rear view of the surface miner 100 in FIG. 1. Each group of electrodes 112, 114 comprises five electrodes (S1-S5, S6-S10) wherein the groups of electrodes 112, 114 have a mirrored but otherwise identical structure.

In this example, each of the group of electrodes 112, 114 is arranged to detect a voltage that is associated with a resistivity of the ground region 102 in response to a current that is directed into the ground region 102. The detected voltage is used to provide the composition information concerning the composition of at least one material layer of the ground region 102 and the thickness information concerning the thickness of the at least one material layer. It should be noted that the thickness information may be provided in the form of information that is indicative of a position, presence or absence of an interface or an interfacial region between two adjacent material layers.

Since the configuration of the two electrodes groups 112, 114 is substantially identical, in the following only the first group of electrodes 112 will be exemplarily described in further detail.

The group of electrodes 112 has three current electrodes S1, S2 and S5, and two voltage electrodes S3, S4. However, a person skilled in the art will appreciate that one electrode may function as a voltage electrode and as a current electrode. In this particular example, the group of electrodes 112 is arranged to perform subsurface resistivity measurements for determining properties of one or more materials of a subsurface of the ground region 102. Specifically, in this example the group of electrodes 112 is arranged to electrical resistivity tomography (ERT) measurements, and surface resistivity measurements. A person skilled in the art will appreciate that various methods for determining the resistivity at a subsurface of a ground region and its arrangements are well known in the art. Exemplary arrangements for ERT measurements may be referred to as minimal Schlumberger array, Wenner array or dipole-dipole array.

In this particular example, for the ERT measurement, two different pairs of current electrodes S1 and S5, and S2 and S5 are selected to direct an alternating current into the ground region 102. However, it should be noted that a direct current is envisaged. The selected pairs of current electrodes have a different distance to each other such that the ERT measurement can be conducted for two different measurement depths. Other possible arrangements for achieving different measurements depths are envisaged, such as moving one electrode relative to another electrode.

The alternating current passing through the ground region 102 sets up a distribution of an electrical potential in the ground region 102. A voltage can then be detected by the two voltage electrodes S3, S4. By detecting the electrical potential between the two voltage electrodes S3 and S4, a resistivity for a subsurface material layer of the ground region 102 can be determined.

The depth of investigation to which a measured resistivity corresponds is dependent on the spacing between the current electrodes s1, s2 and s5. At least one of the current electrodes s1, s2 and s5 may be moveable such that the spacing between the current electrodes s1, s2 and s5 can be varied. Consequently, it is then possible to alter the depth of investigation and obtain information concerning different depth of the layer 102. The electrode spacing may be moveable using a suitable electric arrangement that may be controllable by an operator.

Based on the detected voltage for different measurement depth, information can then be provided concerning the thickness of a material layer. For example, it may be concluded that an interface or interfacial region is present between two material layers.

For the surface resistivity measurement, the resistivity is determined for a surface in the proximity of one of the current electrodes S1, S2 or S5. Methods for determining the surface resistivity are well known in the art, for example the resistivity may be determined by fall-of-potential ground testing. For example, one of the current electrodes may have two components such that a current can be directed along the surface between these two components. The two components are arranged so that the resistivity can be determined for the surface. In an alternative example, the surface resistivity measurement is conducted by using more than one electrode.

In this particular example, the current electrode S2 is positioned at a height level that is lower than the current electrode S5. In particular, current electrode S5 is located at a surface of the ground region 102 and current electrode S2 is positioned at a surface of a groove within the ground region 102. In this example, each of the current electrodes S2 and S5 have two components such that a resistivity can be determined for the surfaces defined by the tips of the electrodes S2, S5. By determining the surface resistivity for surface at two different height levels, the thickness information can be determined in an indirect manner. In this case, the thickness information is provided in the form of information indicative of a relative position of an interface or interfacial region between two adjacent material layers.

For example and as shown in FIG. 1, the tip of the current electrode S2 is located at a surface of a groove that is located within the material layer 102b which represents undesired material, whereas the tip of the current electrode S5 is located at the surface of the material layer 102a which represents desired material. Accordingly, the surface resistivity determined for the surfaces defined by the tips of the two current electrodes S2, S5 will differ by a certain amount. This difference indicates that an interface or an interfacial region is positioned somewhere between the tip of the current electrode S2 and the tip of the current electrode S5. The accuracy of the information indicative of the position of the interface or the interfacial region between the two material layers 102a, 102b is dependent on the distance of height between the tip of the current electrode S2 and the tip of the current electrode S5.

If the tip of the current electrode S2 was located at the surface of a groove within the material layer 102a or 102c, the determined resistance for the two current electrodes S2, S5 would be substantially identical. Thus, it may be concluded that either the tips of the current electrodes S2, S5 are located in the same material layer of the ground region 102 or alternatively that two or more interfaces or interfacial regions are located between the tips of the current electrodes S2, S5.

In one variation of the embodiment as described above the current electrode S2 is one of an array of electrodes and the array comprises further electrodes (not shown in FIG. 1) that are positioned at the same lower level as the current electrode S2 and may form, together with the current electrode S2, a further minimal Schlumberger array, Wenner array or dipole-dipole array. As the further array is positioned at a lower level than the electrodes S1, S3, S4 and S5, the resistivities at two levels within the ground region 102 can in this variation also be determined from measuring the voltages and currents at the electrodes S1, S3, S4 and S5 and at the electrodes of the further (lower level) array. If both resistivities are identical, it is likely that the materials at the two levels are the same and consequently unlikely that an interface exists between the two levels. Alternatively, if the resistivities differ from each other, it is likely that the tips of both arrays are located in different material layers. Further, dependent on the distance between the electrodes of the further array at the lower level, depth information for regions further below (such as further into layer 102b) can be provided.

In one specific example the lower level array has voltage electrodes that are arranged such that a spacing between the voltage electrodes can be altered. In this case one or both voltage electrodes may be moveable such that a depth of investigation can be altered and, dependent on the spacing, either shallower or deeper regions of the layer 102b can be investigated. The electrode spacing may be moveable using a suitable electric arrangement that may be controllable by an operator.

In a further embodiment (not shown), two further groups of electrodes are positioned in front of the milling drum 104 relative to the moving direction of the machine 100. The two further groups of electrodes are positioned at respective left and right tracks of the surface miner 100. Each of the further two groups of electrodes also has three current electrodes and two voltage electrodes. This arrangement is advantageous in that by measuring the difference in ground resistance before and after removal of a portion of material by the milling drum, accuracy of the position of the interface or the interfacial region between two adjacent material layers can be improved.

Figure 3:
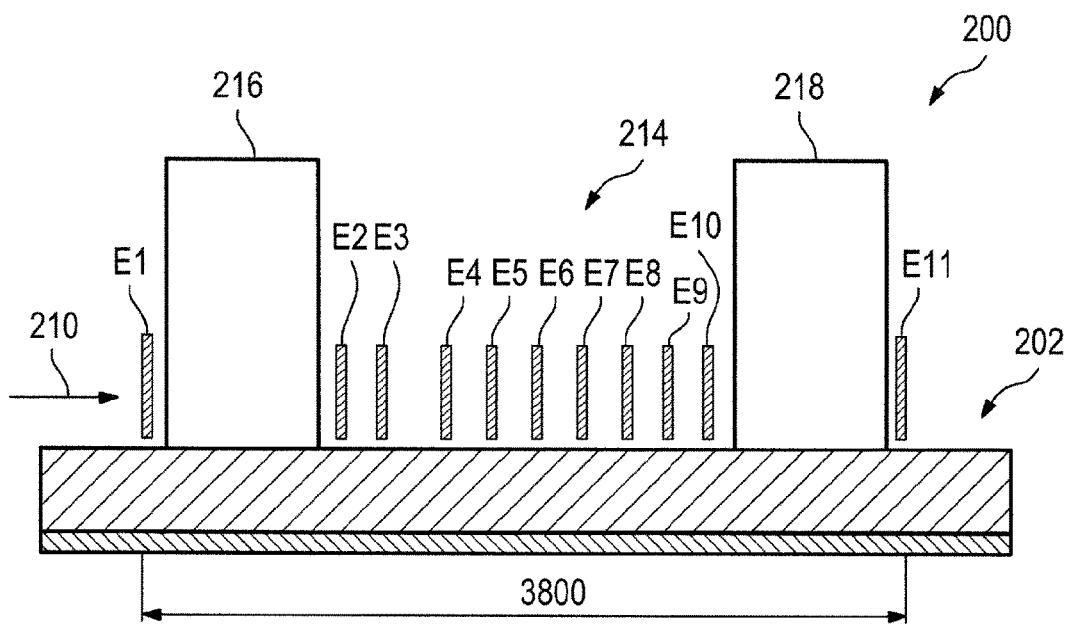
FIG. 3 is a schematic representation of a front view of a surface miner in accordance with a further embodiment of the present invention.
Figure 4:
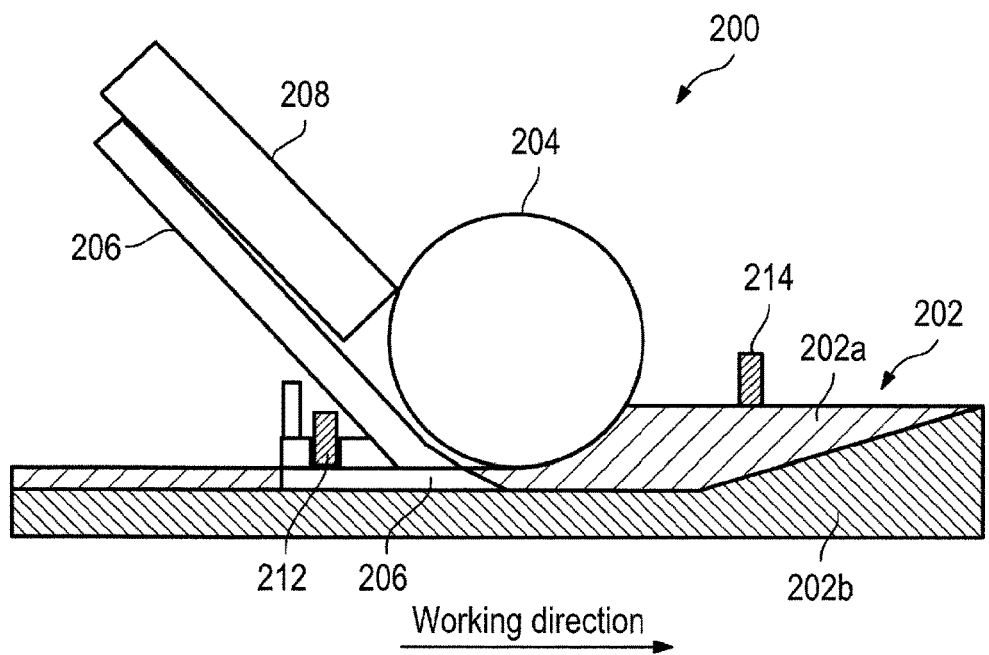
FIG. 4 shows a schematic representation of a side view of the surface miner of FIG. 3.

Referring now to FIGS. 3 and 4, there is shown a surface miner 200 for moving along a ground region 202 and removing a portion of material from a surface of the ground region 202. Similar to the surface miner 100 shown in FIGS. 1 and 2, the surface miner 200 comprises a milling drum 204, a scraper 206 and a conveyor system 208. The surface miner 200 also has a detecting system 210 which comprises a first detector element 212 that is positioned behind the scraper 206 relative to a moving direction of the surface miner 200 as indicated by an arrow in FIG. 4. In this particular example, the first detector element 212 comprises two groups of electrodes identical to the two groups of electrodes 112 and 114 described in relation to the surface miner 100 shown in FIGS. 1 and 2.

In addition, the surface miner 200 comprises a second detector element 214 that is positioned in front of the milling drum 204. In this way, at least one of the composition information and the thickness information of the ground region 202 can additionally be determined before the removal of a portion of the material. This has the significant advantage that the milling process can be adjusted before the material portion is removed from the ground region 202. Accordingly, a more accurate milling process in which less undesired material is milled can be achieved.

The surface miner 200 also comprises a controller (not shown) that is arranged to control the surface miner 200, such as the milling drum 204. Specifically, the controller is arranged to control a milling depth of the milling drum 204 by adjusting the height of the milling drum 204 relative to the surface of the ground region 200. The controller may control the milling drum 204 automatically or in response to an input by an operator of the surface miner 200. In this regard, it may be advantageous to position the second detector element 214 at a position in front of the milling drum 204 such that sufficient reaction time can be provided for an operator to adjust the milling depth of the milling drum 204 based on the provided information. The controller may also be arranged to interrupt operation of the surface miner 200.

For adjusting the milling depth of the milling drum 204, the detecting system 210 may further comprise a display (not shown) for displaying any suitable information to the operator. For example, the display may display the thickness information which may or may not be in the form of information indicative of a position, presence or absence of an interface between two adjacent material layer or in the form of a distance from the milling drum to the interface.

Referring back to the second detector element 214 in front of the milling drum 204, the second detector element 214 comprises a plurality of electrodes E1-E11 as particularly shown in FIG. 3. Specifically, the second detector element 214 comprises a first pair of voltage electrodes E2, E3 that is positioned adjacent a right track 216 of the surface miner 200. The second detector element 214 further comprises a second pair of voltage electrodes E9, E10 that is positioned adjacent a left track 218 of the surface miner 200. Further, the second detector element 214 comprises a plurality of current electrodes E1, E4-E8, E11 that is distributed in a substantially straight line together with the two pairs of voltage electrodes E2, E3, E9, E10.

The plurality of electrodes E1-E11 is arranged to perform ERT measurements for subsurface resistivity measurements. As mentioned above, the measurement depth is dependent on a distance between two corresponding current electrodes. By providing more than two current electrodes for the second detector element 214, different pairs of electrodes can be formed that have different distances between each other. In this way, measurements can be conducted for different depths. Consequently, at least the thickness information may be provided for more than one subsurface material layer of the ground region 202.

For example, in a first measurement a current is directed into the ground region 202 between current electrodes E6 and E11, and a resistivity may be determined by detecting a voltage at the voltage electrodes E9 and E10. In a second measurement a current is then directed into the ground region 202 between current electrodes E8 and E11. However, a person skilled in the art will appreciate that any suitable pair of electrodes may be formed using the arrangement shown in FIG. 3.

A person skilled in the art will appreciate that any one of the current electrodes E1, E4-E8, and E11 may also be arranged such that a surface resistivity may be measured electrode as described in relation to electrode group 112 in FIG. 1. In this regard, one or more of the electrodes may be positioned such that the tip of an electrode is located at a different height level than the tip of at least one other electrode of the plurality of electrodes E1-E11. It should be appreciated that one or more of the plurality of electrodes may be arranged as current electrode and as voltage electrode.

In an alternative embodiment (not shown), the second detector element 214 in front of the milling drum 204 is replaced by two groups of electrodes at respective left and right tracks of the surface miner 100. The two groups of electrodes may be substantially identical to the detector element 212.

Figure 5:
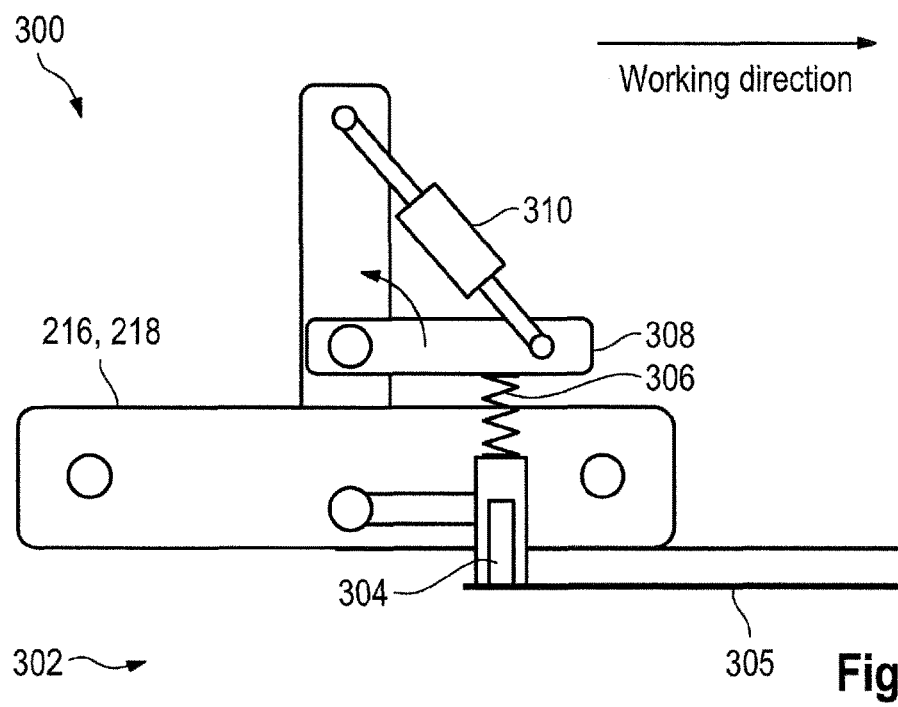
FIG. 5 is a schematic representation of a side view of a surface miner in accordance with a further embodiment of the invention.

Referring now to FIG. 5, there is shown a surface miner 300 that moves along a ground region 302 for removing a material portion of the ground region 302. Similar to the previously described surface miners, the surface miner 300 also has a detecting system. In this example, at least one detector element 304 of the detecting system is positioned in front of a milling drum (not shown) relative to a working direction of the surface miner 300 that is indicated by an arrow in FIG. 5. The detector element 304 may be any suitable detector element that is arranged to detect a quantity associated with a property of the ground region. The property may be an electrical property or any other suitable property other than an electrical property.

In the example shown in FIG. 5, the detector element 304 is moveable relative to the surface miner 300 and the ground region 302. Specifically, the detector element 304 can be raised or lowered relative to the surface miner 300. For example, when the surface miner 300 moves in the working direction, the detector element 304 may be positioned within a groove 305 of the ground region 302 as shown in FIG. 5. The groove 305 may previously be formed by a suitable component of the surface miner 300 that is located in front of the detector element 304.

When the surface miner 300 moves in a direction other than the working direction such as backwards, the detector element 304 may be raised and removed from the groove 305. In this way, the surface miner 300 may move along ground regions that do not have a groove for accommodating the detector element 304 without the risk of damaging the detector element 304. In this example, the detector element 304 is coupled via a spring 306 to a pivotable arm 308 of the surface miner 300. The arm can be pivoted by retracting or extending a hydraulic system 310. Specifically, when the hydraulic system 310 is retracted, the arm 308 pivots upwards and raises the detector element 304 via the spring 306.

The above described configuration is also arranged to vary the pressure of the detector element 304 relative to the ground region 302. This has particular advantages if the surface of the ground region 302 is uneven.

Figure 6:
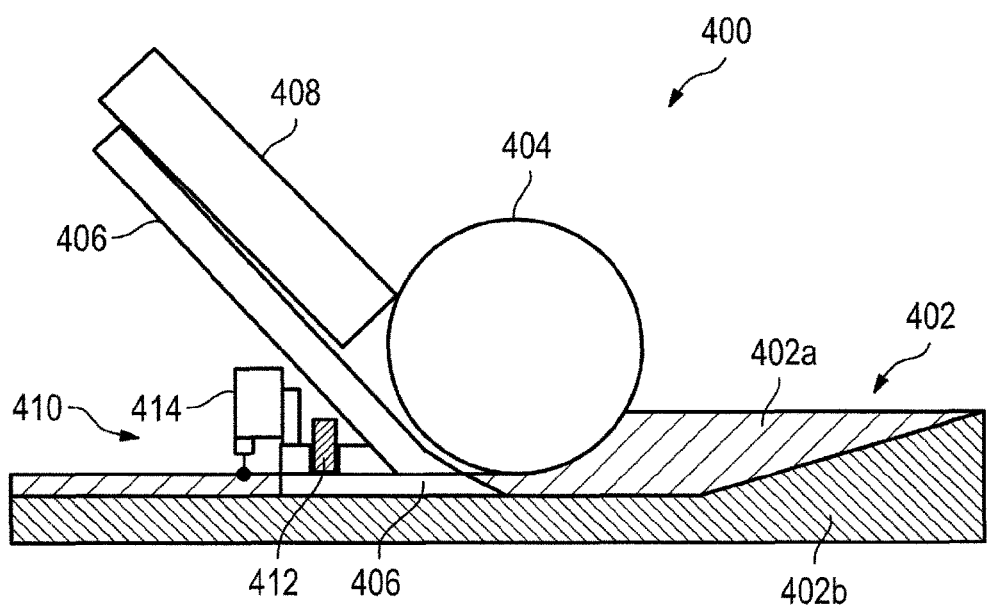
FIG. 6 is a schematic representation of a side view of a surface miner in accordance with a further embodiment of the invention.

Referring now to FIG. 6, there is shown a surface miner 400 in accordance with a further embodiment of the present invention.

The surface miner 400 is similar to surface miners 100 and 200 shown in FIGS. 1 to 4. In particular, the surface miner 400 also comprises a milling drum 404, a scraper 406 and a conveyor system 408. Further, the surface miner 400 has a detecting system 410 that comprises a detector element 412 that is positioned behind the scraper 406 relative to a moving direction of the surface miner 400. The detector element 412 comprises two groups of electrodes identical to the groups of electrodes 112, 114 of the surface miner 100 shown in FIGS. 1 and 2. As mentioned above, the detector element 412 is arranged to perform ERT measurements and surface resistivity measurements.

In addition, the surface miner 400 comprises a further detector element 414 for detecting a further quantity associated with a further property of the ground region other than an electrical property. In this particular embodiment, the further detector element 414 is arranged to perform near-infrared spectroscopy (NIRS). Specifically, the further detector element 414 comprises a near-infrared light source such as a suitable halogen lamp that is arranged to direct the near-infrared light onto a surface area of the ground region 402. The further detector element 414 further comprises a spectrometer (such as a suitable diffraction grating) and a detector that is arranged to detect wavelength specific light intensities. By analysing material specific NIRS spectra, the composition information concerning the composition of at least one material layer of the ground region 402 such as surface material layer 402a can be provided. The analysis of the NIRS spectra may be performed in an automated manner and the information concerning the composition may then be displayed to a user. A person skilled in the art will appreciate that various method of automatically analysing NIRS spectra are known and may be employed to provide both qualitative and quantitative information concerning the composition of at least one material layer of the ground region.

The detected NIRS spectrum is in this example used to calibrate the electrical measurements at the present operating conditions at which the surface miner 400 is used. Measurements such as ERT and surface resistivity measurements are dependent on local conditions of the ground region. By conducting NIRS at substantially the same locations of the ground region as the ERT or surface resistivity measurements, the ERT measurements can be calibrated. In this way, the measurements of the detector element 412 are less dependent on local conditions such as humidity or the like.

It will be appreciated by a person skilled in the art that in alternative embodiments the detector element 414 may be arranged to perform any other suitable wavelength specific spectroscopic analysis. Specifically, the detector 414 may not necessarily be arranged to perform NIRS, but may alternatively be arranged to perform spectroscopic analyses in the infrared, visible or even ultraviolet wavelength range.

In one alternative embodiment the detector element 414 may be arranged to perform laser induced breakdown spectroscopy (LIBS). LIBS is based on the process that each element emits light of characteristic frequencies when excited to sufficiently high temperatures provided by the laser. Specifically, the further detector element 414 comprises a laser that is arranged to direct electromagnetic radiation, for example in the near-infrared wavelength range, onto a surface area of the ground region 402. The further detector element 414 detects an electromagnetic radiation spectrum in response to the emitted electromagnetic radiation by the laser. In this way, the composition information concerning the composition of at least one material layer of the ground region 402 such as surface material layer 402a can be provided.

A person skilled in the art will appreciate that the at least one further detector element may be arranged to perform NIRS or LIBS for at least two different height levels. In this way, the composition information can be determined for the at least two different levels and based on the determined information it may be concluded whether an interface of two different material layers is present between the at least two different height levels. For example, the composition information may be determined for material layers 402a and 402b.

Further, a person skilled in the art will appreciate that any suitable further detector element 414 is envisaged. For example, the further detector element may be arranged to perform optical measurements such as georadar measurements, or other suitable measurements such as gamma ray detection measurements or magnetic measurements.

In a further embodiment (not shown), there is provided a machine such as a surface miner or a road milling machine that is arranged to remove material from a ground region while moving along the ground region. The machine comprises a ground engager for removing a portion of the material from the ground region such as a milling or cutting drum. The machine further comprises a detecting system that has a first detector element and a second detector element. The first detector element is coupled to a component of the machine to move with the machine and is arranged to detect at least one first quantity associated with a first property of the ground region. The second detector element is also coupled to a component of the machine that may or may not be the same component to which the first detector element is coupled. The second detector element is arranged to detect at least one second quantity associated with a second property that is different to the first property. The detecting system is arranged to provide composition information concerning a composition of at least one material layer in the ground region and thickness information concerning a thickness of the at least one material layer, wherein the first quantity is used for providing at least one of the composition information and the thickness information. The first quantity may for example be a voltage or a current and the second property may for example be an intensity of electromagnetic radiation, gamma ray radiation or the like. The first detector element may for example be positioned in front of the ground engager relative to a moving direction of the machine and the second detector element may be positioned behind the ground engager relative to the moving direction of the machine.

In one example, the detecting system is arranged so that the second quantity is used for calibrating the first quantity. In a further example, the first quantity is used to provide at least the thickness information and the second quantity is used to provide at least the composition information. Alternatively, the first quantity may be used to provide at least the composition information and the second quantity may be used to provide at least the thickness information.

Figure 7:
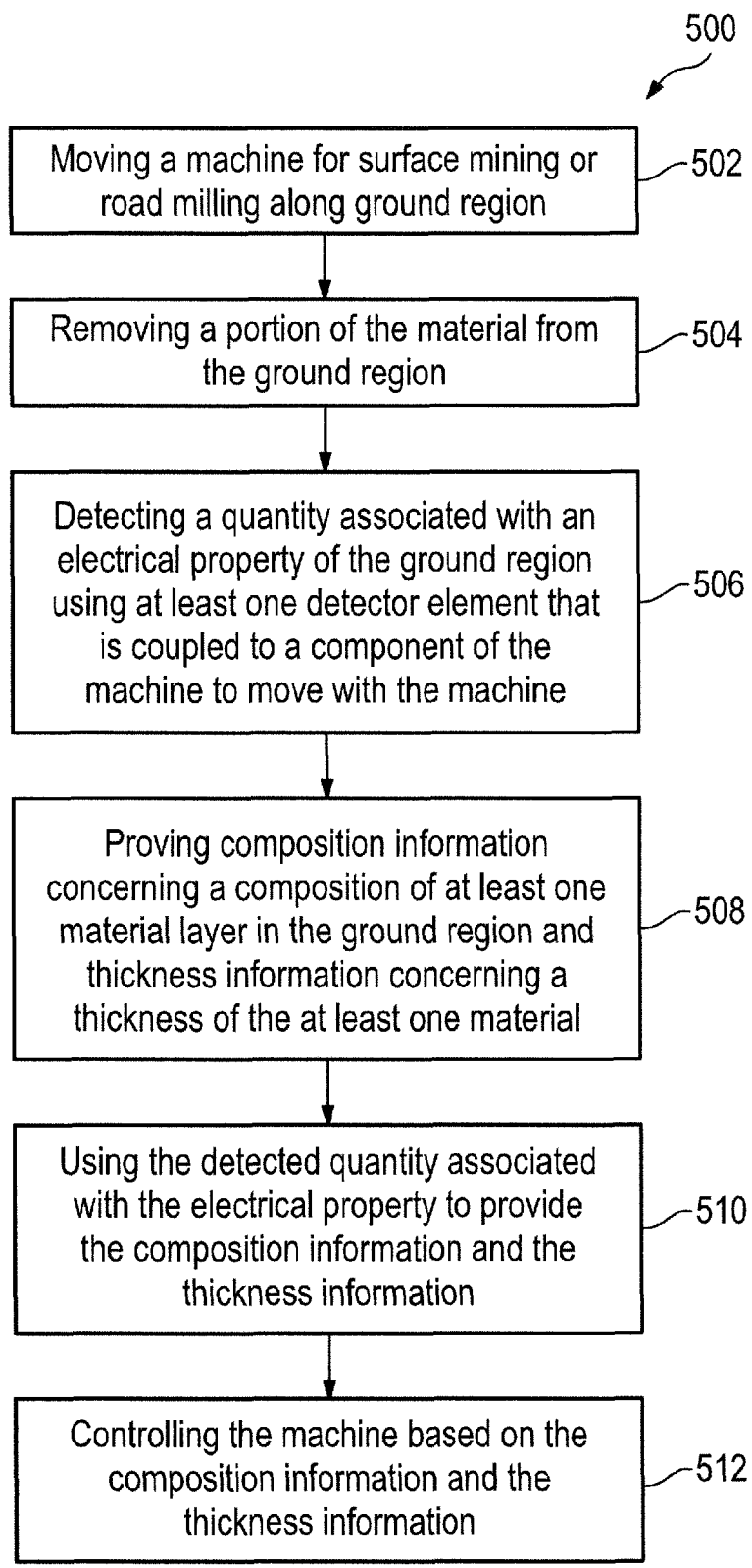
FIG. 7 is a flow chart of a method in accordance with an embodiment of the present invention.

Referring now to FIG. 7, there is shown a flow chart illustrating a method 500 in accordance with embodiments of the present invention. In a first step 502, a machine for surface mining or road milling along a ground region. Such ground region may comprise a plurality of material layers as for example shown in relation to the embodiment shown in FIGS. 1 and 2. While the machine moves along the ground step, in step 504 a portion of material is removed from the ground region. In a further step 506, at least one quantity is detected by a detector element wherein the quantity is associated with an electrical property of the ground region. The quantity may for example be a voltage and the electrical property may for example be a resistivity or an electrical impedance. The detector element is coupled to a component of the machine to move with the machine while removing the portion of material. In step 508 composition information and thickness information are provided. The composition information is any suitable information relating to the composition of one or more material layers of the ground region and the thickness information is any suitable information relating to the thickness of one or more material layers. The thickness information may be in the form of information that is indicative of a position, presence or absence of an interface or an interfacial region between two adjacent material layers. The detected quantity that is associated with the electrical property of the ground region is used to provide at least one of the composition information and the thickness information (step 510). In a specific embodiment, the composition information and the thickness information are provided as a function of the respective quantities. In a further step 512, the machine is controlled based on the composition information and the thickness information. For example, the milling depth of a milling drum may be adjusted based on the provided information.

In some embodiments, the step of detecting 506 is conducted such that quantities associated with the electrical property are detected at more than one location relative to the machine. For example, respective quantities may be detected at positions that are spaced apart from each other, such as behind or in front of the ground engager relative to a moving direction of the machine. Additionally or alternatively, respective quantities may be detected at at least two different height levels relative to the ground region. In this way, the detected quantities may be used to provide the thickness information. In this regard, the method 500 may comprise a further step of forming a groove into the ground region and detecting at least one of the quantities at a height level within the groove.

In a specific example, the method 500 is conducted such that subsurface resistivity measurements such as ERT measurements are conducted at a position in front of the ground engager to provide the thickness information. In this specific example, the method 500 is conducted such that a surface resistivity measurement is performed at a position behind the ground engager to provide the composition information. Optionally, the method 500 may be conducted such that further subsurface resistivity measurements are conducted at the position behind the ground engager to provide the thickness information. Additionally, the method 500 may be conducted such that the surface resistivity measurement at the position behind the ground engager is conducted to also provide the thickness information. For example, the surface resistivity measurement may be performed for at least two different height levels to provide the thickness information.

In some embodiments, the method 500 comprises a step of detecting at least one further quantity associated with a further property of the ground region that is used to provide at least one of the composition information and the thickness information. The further property is a property that is different to the electrical property. This further property may be used to calibrate the detected at least one quantity associated with the electrical property. In this regard, the at least one further quantity may be used to provide the composition information.

The invention claimed is:

1. A machine for surface mining or road milling, the machine being arranged to remove material from a ground region while moving along the ground region, and comprising:
 a ground engager for removing a portion of the material from the ground region; and
 a detecting system comprising:
  a detector element of a first type coupled to a component of the machine to move with the machine, and arranged to detect a first quantity associated with a first property of the ground region; and
  a detector element of a second type other than the first type coupled to a component of the machine to move with the machine, and arranged to detect a second quantity associated with a second property of the ground region other than the first property;
 wherein the detecting system is arranged to provide composition information concerning a composition of at least one material layer in the ground region and thickness information concerning a thickness of the at least one material layer; and
 wherein at least the detected first quantity is used to provide at least one of: the composition information and the thickness information.

2. The machine of claim 1 wherein the detected second quantity is used for calibrating the first quantity at substantially the same location of the ground region.

3. The machine of claim 1 wherein the detected first quantity is used to provide the thickness information and the detected second quantity is used to provide the composition information.

4. The machine of claim 1, further comprising a controller configured to control the machine based on the composition information and the thickness information.

5. The machine of claim 1, wherein the second detector element is arranged to perform a near-infrared spectroscopy or a laser-induced spectroscopy.

6. The machine of claim 5, wherein the first detector element is positioned in front of or behind the ground engager and is configured to perform subsurface resistivity measurements to provide the thickness information, and the second detector element is positioned behind the ground engager and configured to perform the near-infrared spectroscopy or the laser-induced spectroscopy to provide the composition information.

7. The machine of claim 1, wherein at least the first detector element comprises at least one group of electrodes.

8. The machine of claim 7, wherein at least one electrode is in use positioned at a height level that is lower than that of at least one other electrode of the at least one group of electrodes.

9. A method of removing material from a ground region, the method comprising:
moving a machine having a ground engager for surface mining or road milling along the ground region;
detecting at least one quantity associated with an electrical property as a first property of the ground region using at least a detector element of a first type that is coupled to a component of the machine to move with the machine;
detecting at least one quantity associated with a second property of the ground region using at least a detector element of a second type that is coupled to a component of the machine to move with the machine, wherein the second property is different from the first property; and
providing composition information concerning a composition of at least one material layer in the ground region and thickness information concerning a thickness of the at least one material layer;
wherein at least the detected at least one quantity associated with the electrical property is used to provide at least one of the composition information and the thickness information.

10. The method of claim 9, further comprising:
controlling the machine based on the provided composition information and the thickness information.

11. The method of claim 10, wherein the step of controlling the machine comprises controlling a height of the ground engager relative to the ground region.

12. The method of claim 10, wherein the step of controlling the machine comprises interrupting operation of the machine.

13. The method of claim 9, wherein respective quantities associated with the electrical property are used to provide the composition information and the thickness information.

14. The method of claim 9, wherein the step of detecting at least one quantity associated with an electrical property comprises:
detecting at least one quantity associated with the electrical property of the ground region in front of the ground engager, from which at least the thickness information is provided, and
detecting at least one quantity associated with the electrical property of the ground region behind the ground engager, from which at least the composition information is provided.

15. The method of claim 9, wherein the step of detecting at least one quantity associated with an electrical property comprises detecting respective quantities for at least two different height levels relative to the ground region, wherein the detected respective quantities are used to provide the thickness information.

16. The method of claim 15, wherein the step of detecting at least one quantity associated with an electrical property comprises forming a groove into the ground region and detecting at least one of the respective quantities at a height level within the groove.

17. The method of claim 9, comprising performing subsurface resistivity measurements to determine properties of a material of a subsurface of the ground region.

18. The method of claim 9, comprising performing surface resistivity measurements to determine properties of a material of a surface of the ground region.

19. The method of claim 9, comprising:
performing subsurface resistivity measurements at a position in front of the ground engager to determine the thickness information, and
performing a surface resistivity measurement at a position behind the ground engager to provide one or more of the composition information and the thickness information.

20. The method of claim 19, further comprising:
performing subsurface resistivity measurements at the position behind the ground engager to determine the thickness information.

21. The method of claim 9, wherein at least the detected at least one quantity associated with the second property is used to provide at least one of the composition information and the thickness information.

22. The method of claim 21, wherein the detected quantity associated with the second property is used to provide at least the composition information, and the detected quantity associated with the first property is used to provide at least the thickness information.

23. The method of claim 21, further comprising calibrating the detected at least one quantity associated with the first property using the detected at least one quantity associated with the second property.

24. The method of claim 21, further comprising:
directing electromagnetic radiation to the ground region, and
detecting the at least one quantity associated with the second property by detecting electromagnetic radiation received from the ground region in response to the emitted electromagnetic radiation.

* * * * *